United States Patent
Devagupthapu et al.

(10) Patent No.: US 10,824,411 B2
(45) Date of Patent: Nov. 3, 2020

(54) INSTALL FILE SIZE OPTIMIZATION AND INSTALLATION VERIFICATION SYSTEM

(71) Applicant: Bank of America Corporation, Charlotte, NC (US)

(72) Inventors: Sunil Devagupthapu, Telangana (IN); Kumar Dipak Singh, Bihar (IN); Abhishek Singh, Bihar (IN); Anand Govuri, Telangana (IN); Manoj Pollam, Telangana (IN); Neeraj Banga, Haryana (IN)

(73) Assignee: Bank of America Corporation, Charlotte, NC (US)

( * ) Notice: Subject to any disclaimer, the term of this patent is extended or adjusted under 35 U.S.C. 154(b) by 6 days.

(21) Appl. No.: 16/283,931

(22) Filed: Feb. 25, 2019

(65) Prior Publication Data

US 2019/0278578 A1    Sep. 12, 2019

Related U.S. Application Data

(62) Division of application No. 15/354,490, filed on Nov. 17, 2016, now Pat. No. 10,261,770.

(51) Int. Cl.
*G06F 8/61* (2018.01)
*G06F 8/658* (2018.01)

(52) U.S. Cl.
CPC .............. *G06F 8/61* (2013.01); *G06F 8/658* (2018.02)

(58) Field of Classification Search
CPC .................................................. G06F 8/61
USPC ........................................................ 717/175
See application file for complete search history.

(56) References Cited

U.S. PATENT DOCUMENTS

| | | |
|---|---|---|
| 6,907,604 B1 | 6/2005 | Macnair, Jr. et al. |
| 7,398,524 B2 | 7/2008 | Shapiro |
| 7,694,291 B2 | 4/2010 | Chen et al. |
| 8,301,874 B1 | 10/2012 | Heidingsfeld et al. |
| 9,128,799 B2 | 9/2015 | Ewington et al. |
| 2005/0022175 A1 | 1/2005 | Sliger et al. |
| 2008/0201705 A1 | 8/2008 | Wookey |
| 2011/0113226 A1* | 5/2011 | Ewington .............. G06F 8/658 713/2 |

(Continued)

OTHER PUBLICATIONS

"Creating InstallShield Response Files"; IBM.com website [full url in ref.]; Jan. 10, 2004 (Year: 2004).*

(Continued)

*Primary Examiner* — Wei Y Zhen
*Assistant Examiner* — Clint Thatcher
(74) *Attorney, Agent, or Firm* — Banner & Witcoff, Ltd.; Michael A. Springs

(57) ABSTRACT

The disclosure describes a tool that decreases the size of a software installation file by segregating and/or allowing customization of the original software installation file. The resulting install file permits multiple configurations to be created using the same install file by using custom configuration settings. The optimized software installation file permits the automated (or semi-automated) installation of software and/or software updates/upgrades on a remotely located electronic device. Moreover, aspects of the tool may also regulate compliance with possible reboot/restart requirements of the software/upgrade installation that may be useful for electronic devices which are remotely located.

17 Claims, 8 Drawing Sheets

(56) References Cited

U.S. PATENT DOCUMENTS

| | | | | |
|---|---|---|---|---|
| 2011/0113414 A1* | 5/2011 | Ewington | ............... | G06F 8/658 717/168 |
| 2011/0113415 A1* | 5/2011 | McCurdy | ................. | G06F 8/61 717/168 |
| 2011/0113418 A1* | 5/2011 | McCurdy | ............... | G06F 8/658 717/170 |
| 2011/0113421 A1* | 5/2011 | Ewington | ............... | G06F 8/658 717/174 |
| 2011/0239212 A1* | 9/2011 | Wookey | ................ | G06F 8/658 717/178 |
| 2015/0277885 A1 | 10/2015 | Kimoto et al. | | |
| 2018/0136920 A1* | 5/2018 | Devagupthapu | ........ | G06F 8/658 |

OTHER PUBLICATIONS

"WISEscript—Automate and Improve Your Business Operations"; Wise-ware.com website [full URL in ref.]; Oct. 11, 2011 (Year: 2011).*

Lori Kaufman; "How to Change Windows Default Currency from Dollars to Euros"; HowToGeek.com website [full url in ref.]; Jan. 26, 2016 (Year: 2016).*

Oct. 11, 2011, "MSI File Format", Whatis.com website, URL: https://whatis.techtarget.com/fileformat/MSI-Installer-package-Microsoft-Windows, 2pp.

Oct. 11, 2011, "WISEscript—Automate and Improve your Business Operations", Wise-ware.com website, URL: http://www.wise-ware.com/WISEscript.php?, 2 pp.

Jul. 26, 2018—U.S. Office Action—U.S. Appl. No. 15/354,490.

Binary file, retrieved Oct. 5, 2016, https://en.wikipedia.org/wiki/Binary_file, 3 pages.

InstallShield, retrieved Oct. 5, 2016, https://en.wikipedia.org/wiki/InstallShield, 2 pages.

Package manager, retrieved Oct. 5, 2016, https://en.wikipedia.org/wiki/Package_manager, 7 pages.

Principle of least privilege, retrieved Oct. 5, 2016, https://en.wikipedia.org/wiki/Principle_of_least_privilege, 4 pages.

Windows Installer CleanUp Utlity, retrieved Oct. 5, 2016, https://en.wikipedia.org/wiki/Windows_Installer_CleanUp_Utility, 2 pages.

* cited by examiner

INSTALL FILE SIZE OPTIMIZATION AND INSTALLATION VERIFICATION SYSTEM

This application is a divisional of U.S. patent application Ser. No. 15/354,490, filed Nov. 17, 2016, the entirety of which is herein incorporated by reference.

TECHNICAL ASPECTS

Aspects of the disclosure describe a tool that decreases the size of a software installation file (e.g., package of files) by, inter alia, segregating and allowing for customization of the original software installation file. The resulting install file permits multiple configurations to be created using the same install file by using, inter alia, custom configuration settings. In particular, application configurations, which may be regional/event-based/instance-based, may be captured in a configuration file that permits the automated (or mostly automated) installation of software and/or software updates/upgrades on a remotely located electronic device. The configuration file may be embodied in a script (e.g., a single script of multiple scripts). Moreover, aspects of the aforementioned tool regulate compliance with possible reboot/restart requirements of the software/upgrade installation that may be useful for electronic devices which are remotely located.

RELATED APPLICATIONS

This application is related to U.S. Pat. No. 9,128,799 (U.S. Ser. No. 12/731,580), entitled, "Programmatic Creation of Task Sequences from Manifests," filed Mar. 25, 2010 and issued Sep. 8, 2015, the entirety of which is herein incorporated by reference.

This application is also related to U.S. Pat. No. 9,489,110 (U.S. Ser. No. 13/662,859), entitled, "Automatic Deployment, Configuration, and Lifecycle Management of Applications and Infrastructure Components," filed Oct. 29, 2012 and issued Nov. 8, 2016, the entirety of which is herein incorporated by reference.

BACKGROUND

Multiple configuration packaging (or huge size application management) involves, inter alia, the process of handling when an application is installed with different configurations based on the region in which it is installed, or more generally, based on the environment in which it is installed. In some installations, regulations and compliance requirements may dictate how an application is required to be configured to operate. Multiple configuration packaging may also involve interacting with local servers so that its large-sized files can be smoothly deployed.

When multiple configuration packaging is done manually, the information technology (IT) user replicates his efforts to configure the installation based on each set of requirements. Moreover, with each new software installation, the IT user first must thoroughly understand the application's behaviour. Coding and logic may also be created to comply with the specific requirements of an environment or region. In addition, beta testing may be performed to ensure a quality deliverable.

In addition, software installations are not limited to just traditional desktop computers. Multiple configuration packaging also creates a burden other electronic devices upon which software (e.g., firmware) is installed. One example are self-service financial transaction devices (SSFTDs), such as automated teller machines (ATMs) provided by service providers such as banks and other financial institutions, for use by customers. While the SSFTDs provide a useful service to the customers, there is a significant burden imposed on the service provider to maintain and upgrade the SSFTDs. This burden becomes nearly overwhelming in the case of large institutions, which may have thousands upon thousands of SSFTDs distributed across thousands of miles. Moreover, when periodically upgrading the software on the SSFTDs, the service provider may often need to upgrade all of the SSFTDs within a short window of time, so that, for instance, all of the SSFTDs provide a consistent user experience. The SSFTDs are commonly interconnected by a network, however providing upgraded software to all of the SSFTDs over the network may not be practical or economical due to typical network bandwidth limitations.

The multiple configuration packaging process can be quite repetitive and time consuming. Moreover, any error, no matter how small, may lead to rework and regulatory compliance issues, particularly in different regions/markets around the globe. Therefore, there exists room for improvement in the custom configuration and/or installation of software applications, particularly large software applications to a plurality of users with varying needs, requirements, and/or environments/platforms.

BRIEF DESCRIPTION OF DRAWINGS

A more complete understanding of the present disclosure and the potential advantages of various aspects described herein may be acquired by referring to the following description in consideration of the accompanying drawings, in which like reference numbers indicate like features, and wherein.

BRIEF SUMMARY

Figure 1:
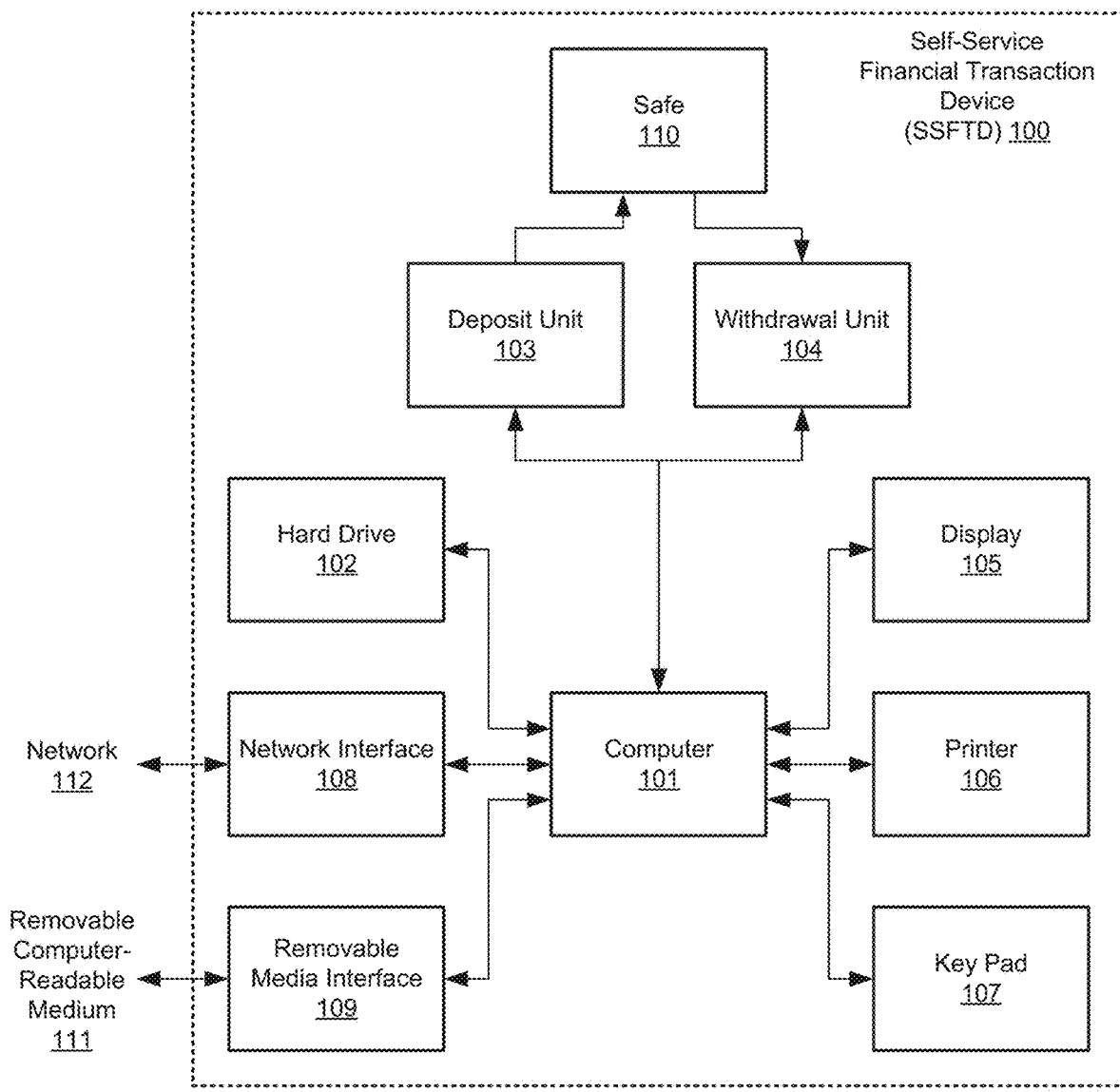
FIG. 1 is an illustrative functional block diagram of a self-service financial transaction device (SSFTD) 100.

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for optimizing a software install file size and verification installation of the file on a system. Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be implemented as computer-readable instructions stored on a computer-readable medium, such as a non-transitory computer-readable medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the disclosure will occur to persons of ordinary skill in the art from a review of this disclosure. For example, one of ordinary skill in the art will appreciate that the steps illustrated herein may be performed in other than the recited order, and that one or more steps illustrated may be optional in accordance with aspects of the disclosure.

For example, in one embodiment, a non-transitory computer-readable medium storing instructions is described for optimizing a software install file size and verification installation of the file on a system. When the stored instructions are executed, they cause a self-service monetary device (SSFTD) such as an automated-teller machine (ATM) to automatically download, to the SSFTD over a communications network, a software installation file. The size of the software installation file may be optimized by an installation server machine to be a smaller size than an unoptimized software installation file. In some examples, the unoptimized software installation file may be one-half the size of the optimized software installation file. The aforementioned instructions may further cause the SSFTD to receive data representing a first manifest and determine a first one of the plurality of software components that is identified by, but not part of, the first manifest. Next, the SSFTD may request transfer of the first one of the software components to the SSFTD's memory and then generate, by the SSFTD, an updated, separate task sequence comprising a set of instructions for installing the first one of the software components to a software stack residing on the SSFTD. The updated separate task sequence may then be transferred to the SSFTD.

In some embodiments, the updated, separate task sequence may cause the SSFTD to automatically de-install from the software stack the one of the software components with a lower version number identified as residing on the first manifest, and then automatically install to the software stack the software component with the higher version number residing on the second manifest. In other embodiments in accordance with various aspects of the disclosure, the SSFTD may perform other steps. For example, in some embodiments, the updated task sequence may cause the SSFTD to regulate compliance with and ensure reboot after an automated installation of a software install file.

In another example, a method is described for optimizing a software install file size and verification installation of the file on a system. The method may be performed by an installation server that optimizes a software installation file to be a smaller size than an unoptimized software installation file by performing numerous steps. The installation server may establish communication over a network with a SSFTD and then automatically analyze the environment of the SSFTD by, inter alia, accessing configuration settings of the SSFTD. In response to detecting a predetermined configuration value in the configuration settings of the SSFTD, the installation server may update a first manifest by removing a first one of a plurality software components in the first manifest. The installation server may also optionally download the plurality of software components identified in the updated first manifest to a memory of the installation server. The installation server generates an optimized software installation file using the updated first manifest and the plurality of software components identified in the manifest. In addition, the installation server generates a task sequence comprising a set of instructions for installing software install file on the SSFTD. Finally, the installation server transfers (e.g., transmits) the task sequence and the optimized software installation file to the SSFTD for execution on a software stack residing on the SSFTD.

In yet another example, the disclosure describes an apparatus for optimizing a software install file size and to regulate compliance with and ensure reboot after an automated installation of a software install file on a system. The apparatus may comprise a processor and a memory storing computer-executable that, when executed by the processor, cause the apparatus to perform a method with numerous steps. For example, the method may comprise filtering the software install file by filtering based on configuration file extensions and recording configuration content from the software install file. The method may also create a post-reboot scheduling task sequence and attach the post-reboot scheduling task sequence to an answer file in the software install file. The post-reboot scheduling task sequence may causes a batch file to execute a task schedule command-line interface tool on an SSFTD installing the software install file. The method may further access a service transaction log of the SSFTD corresponding to the task schedule command-line interface tool and determine that the service transaction log comprises confirmation that an installation of the software install file was completed. Upon making that determination, the system confirms that any updates required by the software installation update have been completely installed and regulatory compliance has been met.

DETAILED DESCRIPTION

Some aspects of the disclosure include, but are not limited to: 1. the tool generates a single installation file with multiple, different functions/configurations, with minimal manual intervention; 2. the tool reduces the size of huge-size application installation files without changing the functionality; 3. the tool handles user changes and system context configurations; 4. the tool handles validation of source binaries in a unique, automated way; 5. the tool incorporates (e.g., appends) logic/code to upgrade from a prior release; and 6. enhances the engineering life cycle of a software application and automates repetitive steps performed during packaging.

Additional features include, but are not limited to, those that save an IT user time and efforts to help complete the start-to-finish process of a software installation. For example, (1) differentiating the values basing on a configuration file, (2) differentiate the main requirement versus the prerequisites that are already as part of components, (3) create customized creation of vendor source install option, (4) independent of any customized requirement, (5) independent of source (e.g., setup.exe/bunch of files), (6) supports any packaging method (e.g., wrapper setup), (7) customized for post-reboot configuration in system context, (8) user-specific registry configuration handler (e.g., for a HKEY current user, such that programs listed in the load value of the registry key HKCU run when any user logs onto a machine and/or machine reboots), (9) custom actions can be defined (e.g., grant permission\delete files\remove folders\others), (10) automating the answer file creation, and (11) automating the executable file that takes answer file as input.

Furthermore, additional examples include an automated process to reduce size of source file for software installations. Aspects of the disclosure describe a tool that decreases the size of a software installation file (e.g., package of files) by, inter alia, segregating and allowing for customization of the original software installation file. Aspects of the process may, in some examples, involve fetching the required configuration and creating answer file/response file that contains the multiple configuration and huge size application information with standard instructions applied to it. In such an example, the method may include identifying changes and automating the customization with a filtered answer file/response file that is processed and appended with a script, which is compiled to get an executable. Hence, the system and process help the technological information technology (IT) department reduce efforts and ensures timely delivery to maintain 100% service level agreement (SLA) and accuracy. IT user post analyses of the media, it will be processed through the tool, which will take part in two phases, before an answer file/response file is created and then we compile and install. In additional examples, aspects of the aforementioned method may regulate compliance with possible reboot/restart requirements of the software/upgrade installation that may be useful for electronic devices which are remotely located.

FIG. 1 is an illustrative functional block diagram of a self-service monetary device (SSFTD) 100. SSFTD 100 may include, for instance, an automated teller machine (ATM) or automated kiosk for depositing and/or withdrawing monetary amounts. While the withdrawals are typically provided to the user of the SSFTD 100 as currency, the deposits may be in the form of currency or checks.

SSFTD 100 as shown in FIG. 1 includes a computer 101, a hard drive 102 or other computer-readable medium, a deposit unit 103, a withdrawal unit 104, a display 105, a printer 106, a camera 107, a network interface 108, a removable media interface 109, and a safe 110. Although computer 101 is labeled as a "computer," any one or more of the other functional blocks in FIG. 1 may also be or include a computer. As understood, SSFTD 100 may include one or more computers 101, hard drives 102, deposit units 103, withdrawal units 104, displays 105, printers 106, key pads 107, network interfaces 108, removable media interfaces 109, and safes 110.

The term "computer" as referred to herein broadly refers to any electronic, electro-optical, and/or mechanical device, or system of multiple physically separate or physically joined such devices, that is able to process and manipulate information, such as in the form of data. Non-limiting examples of a computer include one or more personal computers (e.g., desktop or laptop), servers, smart phones, personal digital assistants (PDAs), television set top boxes, and/or a system of these in any combination or subcombination. In addition, a given computer may be physically located completely in one location or may be distributed amongst a plurality of locations (i.e., may implement distributive computing). A computer may be or include a general-purpose computer and/or a dedicated computer configured to perform only certain limited functions.

A computer may includes hardware that may execute software and/or be configured in hardware to perform specific functions. The software may be stored on a computer-readable medium in the form of computer-readable instructions. A computer may read those computer-readable instructions, and in response perform various steps as defined by those computer-readable instructions. Thus, any functions attributed to any of the functional blocks of FIG. 1 as described herein may be implemented, for example, by reading and executing such computer-readable instructions for performing those functions, and/or by any hardware subsystem (e.g., a processor) from which the computer is composed.

The term "computer-readable medium" as used herein includes not only a single physical medium or single type of medium, but also a combination of one or more physical media and/or types of media. Examples of a computer-readable medium include, but are not limited to, one or more memory chips, hard drives (e.g., hard drive 102), optical discs (such as CDs or DVDs), magnetic discs, and magnetic tape drives. A computer-readable medium may be considered part of a larger device or it may be itself removable from the device. For example, a commonly-used removable computer-readable medium is a universal serial bus (USB) memory stick that interfaces with a USB port of a device.

computer-readable medium may store computer-readable instructions (e.g., software) and/or computer-readable data (i.e., information that may or may not be executable). In the present example, a computer-readable medium (such as memory) may be included in any one or more of the functional blocks shown in FIG. 1 and may store computer-executable instructions and/or data used by any of those functional blocks. Alternatively or additionally, such a computer-readable medium storing the data and/or software may be physically separate from, yet accessible by, any of the functional blocks shown in FIG. 1.

Where SSFTD 100 is an ATM, computer 101 is typically embodied as a personal computer. In this example, computer 101 may be responsible for the overall control of SSFTD 100. To perform such control, computer 101 may execute, for example, one or more software applications, one or more device control programs, and one or more operating systems, each of which may be stored on hard drive 102, which may be a single physical hard drive or multiple physical hard drives. These various elements will be discussed in further detail below.

Hard drive 102 may be a single physical hard drive unit or may include multiple physical hard drive units. Rather than, or in addition to, hard drive 102, SSFTD 100 may store data and/or computer-executable instructions on one or more other types of computer-readable medium, such as an optical disc drive, a magnetic tape drive, and/or memory chips.

Deposit unit 103 may be responsible for physically receiving deposited items such as currency and checks, for physically counting the deposited items, for physically holding the deposited items in an escrow area during a deposit transaction, for determining the value of the deposited items, and for physically transferring the deposited items to safe 110 when the transaction is complete. Such deposit units 103 are well-known and often used in many ATMs today.

Withdrawal unit 104 may be responsible for physically retrieving currency or other items from safe 110 during a withdrawal transaction, and for physically providing the retrieved currency to the user. Such withdrawal units 104 are well-known and often used in many ATMs today.

Display 105 may be responsible for displaying a visual user interface to the user, and may also incorporate a touch screen capability for receiving user input. Typical information that may be presented on display 105 includes text and/or graphics representing the status of a transaction. Likewise, printer 106 may be responsible for presenting a paper printout containing information about a transaction. Again, these two elements are often found in conventional ATMs.

Key pad 107 may include one or more buttons, switches, and/or other physical user input elements, and may be responsible for receiving user input associated with a transaction. For example, key pad 107 may include digit keys zero through nine and other function keys.

Network interface 108 may be responsible for data communication between SSFTD 100 and a network 112. The communication may be uni-directional or bi-directional. Network 112 may be a single network or combination of multiple coupled networks, and may be wireless and/or wired. Examples of network 112, or portions thereof, include the Internet, a cellular telephone network, a cellular data network, a wired or wireless local area network, and a satellite communication network.

Removable media interface 109 may be responsible for reading from and/or writing to a removable computer-readable medium 111, such as a USB key, a compact disc (CD), a floppy magnetic disc, or a portable hard drive. Removable media interface 109 may therefore include a physical port for plugging in or otherwise temporarily receiving removable computer-readable medium 111. This port may be physically part of, for instance, the housing of computer 101. However, the port may be located elsewhere in or on SSFTD 100, such as on a rear housing of SSFTD 100 that may be accessible to maintenance servicers of SSFTD 100 but not necessarily to the general public. Regardless of the location of the port, data read from removable computer-readable medium 111 by removable media interface 109 may be provided to computer 101, and data provided by computer 101 may be written by removable media interface 109 to computer-readable medium 111.

Figure 2:
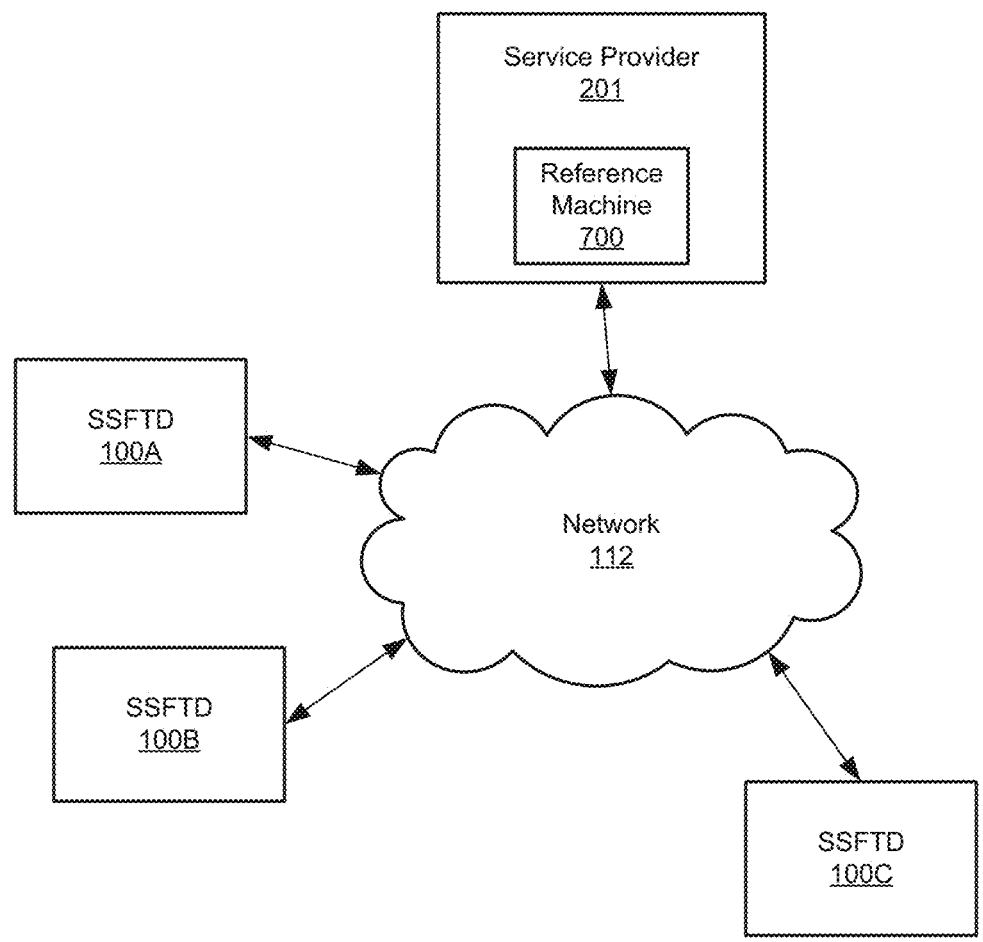
FIG. 2 is an illustrative functional block diagram of a system including a plurality of SSFTDs and a service provider interconnected via a network.

FIG. 2 shows an illustrative system including network 112, a plurality of SSFTDs 100A, 100B, 100C, and a service provider 201 that may include at least one reference machine 700. Service provider 201 may be an entity that is responsible for the software maintenance of SSFTDs 100A-C. Service provider 201 may be, for example a bank or other financial institution, or it may be purely a software maintenance entity.

Reference machine 700 may be located at or otherwise be under the control of service provider 201, and may be embodied as one or more computers. In one example, reference machine comprises a computer including a hard drive for storing a software stack that is built at reference machine 700. The software stack stored at reference machine 201 may be used as a master software stack that is propagated to one or more of SSFTDs 100A-C. As will be described in further detail, this reference software stack, and updates thereto, may be propagated to SSFTDs 100A-C in any of a number of ways. For instance, where the software stack is to be propagated to one of the SSFTDs for the first time or is intended to completely replace any software stack representation at the SSFTDs, then the software stack may be imaged, and the image of the software stack is sent to the SSFTDs rather than the individual components of the software stack. This may reduce the opportunities for errors to occur while installing the software stack at the SSFTDs, because rather than a large number of installation commands for the various components, only a relatively simple set of installation commands may be needed to unpack the image into a software stack at the SSFTDs.

Where the reference software stack undergoes a major change (e.g., version 1.0 to version 2.0), another way that this change may be propagated to the SSFTDs is to send a delta patch file representing only the change. As will be described in further detail, because the SSFTDs may retain a copy of the original software stack image, this propagation may be accomplished by imaging a combination of the software stack prior to the change and the software stack after the change into a single combined image, then imaging only software stack prior to the change, and then determining a delta (difference) between the combined image and the before-change-only image. This delta may be embodied in a file, referred to herein as a delta patch file. At the SSFTD end, this delta patch file may be utilized in combination with the stored pre-change full software stack image at the SSFTD to generate a working new software stack.

On the other hand, where the updates to the software stack are rather minor (e.g., version 1.2 to version 1.21), then the new or added software components (and/or their installers) may be sent to the SSFTDs. In some embodiments, a stack may generally refer to a collection of elements grouped for a specific function or convenience. Stacks may have authors, group ownership, and can be versioned. Two examples of stack classes are an S-Stack and a C-Stack. An S-Stack may only contain elements. A C-Stack may contain elements as well as one or more S-Stacks. Types of stacks may include an OS Stack, a Public Stack, and a Custom stack. The OS Stack may be available to at least some or all users, and may include an OS Image and a default system configuration. A designer of the OS Stack may manage the OS Stack. A public stack may be available to at least some or all users, include a default bucket, and may specify public stack specific to a hardware profile. The default bucket may include a default setup for various types of applications, hardware, or other resources. Examples include a default setup of a database server, a web server, a middleware server, standard security settings, high security settings, and the like. The hardware profile may define appropriate computing hardware or resource specifications (e.g., CPU, RAM, speed, and the like). A Public Stack Designer may manage the public stack. A custom stack may only be available for use by an application team (app team), and may contain configuration elements that provide further tuning/customization.

Reference Software Stack. As previously discussed, whether generating an image file on a reference machine or receiving an image at a destination SSFTD, such as an ATM, one or more aspects of the present disclosure are directed to an originating (reference) software stack created at reference machine 700, a representation of that reference stack (e.g., an image) or changes thereto being sent to one or more destination SSFTDs, and creating or updating a software stack locally at the destination SSFTDs based on the sent representation and/or based on a representation already stored earlier at the destination SSFTDs.

First, the reference machine 700 may boot into a memory-resident (e.g., RAM-resident) operating system. Next, the reference machine 700 may create the reference software stack by being provided with installers for all software components either to be installed or available for installation. These installers may be retrieved from, for instance, a network shared volume. In addition, an instruction sequence may be fetched, such as from the network shared volume. The instruction sequence may be, for instance, an extensible markup language (XML) file that identifies the specified software components to be installed for a software stack on the reference machine, the order of the installation of the various components, and the installation commands themselves. This instruction sequence used to build the reference stack will be referred to herein as the reference stack task sequence.

The reference software stack may be an amalgam of various software installation packages within various logical layers. The specified software components to be installed for reference software stack may generally fall, in this example, within one of three layers: an operating system layer, a device management layer, and an application layer that may include miscellaneous software applications to support maintenance, software distribution, monitoring, and security. One or more of these layers may originate from one or more different vendors and/or internal development teams of the entity utilizing the software stack. Each layer may be comprised of multiple applications or components.

The root layer may be the operating system layer that the reference machine 700 will boot into at launch and operate in for normal conditions. In some examples, the next layer for installation in the ordered sequence may be the software components associated with the device control or device management layer. A device control layer includes software components that provide the functionality required to control all devices associated with the SSFTD to which the stack will eventually be propagated. The device control layer may be or include, for instance, extensions for financial services (XFS), a programming interface commonly used for controlling associated peripheral devices in an ATM. Where the SSFTDs are ATMs, the associated peripheral devices may be, for example, an access card reading system, the security camera system, the check deposit system, the cash dispenser system, etc, and/or any of the devices described above in connection with FIG. 1.

Application programming interfaces (API) may be also provided in the device management layer. When a vendor has a new device for an associated peripheral device, such as a new access card reader, the vendor provides an API that adheres to a standard for the device control layer ensuring that the new device can slide in to operation without a cumbersome retrofit. As such, for the various devices involved, the device control layer may include one or more software components.

Meanwhile, the application layer may include, for example, software components for execution of business logic and presentation of user interfaces to an end customer, as well as ancillary software, such as third party support and diagnostic software. Software for monitoring the machine may not be an application for an end user within the application layer and, as such, may be resident within an ancillary software layer separate from the application layer. For each respective layer, there may be multiple software installation packages or components. The order of installation of layers as well as the order of installation of specified software packages within a layer may be defined by the reference stack task sequence.

For any particular destination SSFTD, the software stack on that SSFTD may also need to include customization due to the specific hardware the software stack is to be interacting with. For example, the name of the computer in the SSFTD, security identifiers, and driver cache are but three examples of data that may be included in the software stack. However, such information may not be already included in the reference stack at the reference machine, because these examples of data would be different for each SSFTD. As such, it may be desirable to instead generalize the reference stack image to remove such identifiers, such as using Sys-Prep, to prepare the image for distribution to multiple different machines. The generalized stack then may be migrated to the SSFTDs for loading and subsequent customization.

Figure 3:
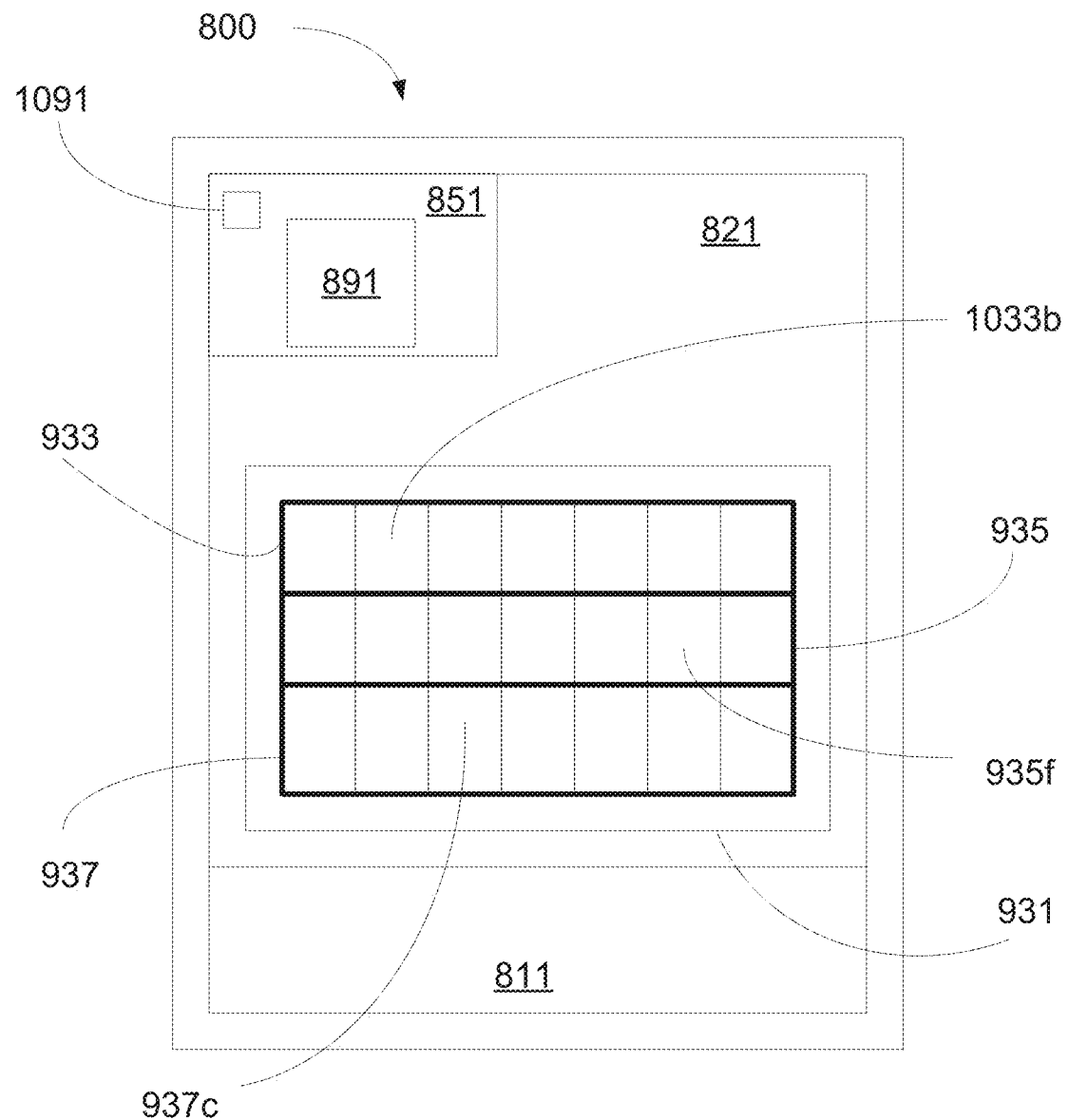
FIG. 3 illustrates an example where an incremental change to the software stack of a destination machine is performed.

Software Stack on SSFTD. FIG. 3 illustrates an example of a core configuration of a destination machine 800, such as one of the SSFTDs 100A-C. FIG. 3 illustrates a destination machine that has yet to have any type of executable software stack for normal operation. FIG. 3 illustrates a destination machine that lacks a general purpose operating system. Destination machine 800 is shown to include a core, which in this example is a motherboard with hard drive 821, power supply, and other hardware components 811. Since the core does not yet have an operating system to launch into yet, the core may be configured to boot into a RAM resident operating system.

Hard drive 821 of the destination machine 800 also may include a logically protected region 851. This logically protected region 851 may be physically separate from other data storage locations of the reference machine 800 or it may be a defined area of the hard drive 821 that is protected from an operation to clean the remainder of the hard drive 821. Logically protected region 851 of the hard drive 821 provides that when a command to clean the remainder of the hard drive 821 is executed, logically protected region 851 is not erased, modified, or affected. Only the portion of hard drive 821 that is not logically protected would be cleaned. As such, logically protected region 851 may maintain data that will not be inadvertently removed from the hard drive 821. As described herein, logically protected region 851 of destination machine 800 may store an image 891 (or multiple images), installer components, and installation instructions (also referred to herein as a task sequence) as received from a reference machine via a network, as well as the RAM-resident operating system.

Task sequences may be provided from the reference machine along with the image, the delta patch file, and/or installation components. Still further aspects are directed to automatically and programmatically generating the task sequences by a computer (such as the reference machine) that analyzes a plurality of uniformly-formatted manifests describing the changes to the software stack components and uses the manifests to generate the task sequences. Yet still further, aspects are directed to at least three types of task sequences that may be sent to an SSFTD: a re-imaging task sequence (for installing a stack from scratch from an image, such as where the hard drive on the SSFTD is brand new); an incremental task sequence (for installing component upgrades to an existing SSFTD software stack; and a cumulative task sequence (for installing a stack from scratch from an image and subsequently installing any component upgrades to that stack). These task sequences may be separate task sequences or they may be combined into a single longer task sequence with various logical entry points into the sequence depending upon whether a re-imaging, incremental, or cumulative process is desired at the SSFTD.

Whether received at the destination machine 800 electronically via a network, or received physically, such as by use of a USB storage device transfer into removable media interface, an image may represent a generalized software stack migrated to the destination machine from a reference machine. The image may be, for example, one or more file-based disk image format files, such as one or more .wim formatted files, that represent a software stack desired to be loaded onto the destination machine 800, i.e., a software stack generated at the reference machine. Other imaging technologies, such as a sector based image technology may alternatively be used. Having received the image 891 now stored in the logically protected area 851 of hard drive 821 on the destination machine 800, an executable software stack may be created onto the non-protected area of the hard drive 821.

Software stack 931 may include an operating system layer 937 that the destination machine 800 will boot into at launch and operate in for normal conditions. Various patches, including security patches, may be separately installed as software components, such as software component 937c.

The stack 931 also includes a device management layer 935. Device control layer 935 includes software components that provide the functionality required to control all devices associated with the destination machine 800. In the example of an ATM, the associated peripheral devices may be an access card reading system, a security camera system, a check deposit system, a cash dispenser system, etc.

The stack 931 also includes an application layer 933. The application layer 933 is designed to include software components for execution of business logic and presentation of user interfaces to an end customer utilizing the destination machine 800. The software stack 931 having been installed, and upon customization of the stack 931, the destination machine 800 now may operate in normal conditions.

Changes to the Software Stack on the SSFTD. At times, it may be desirous to change the software stack of a destination machine 800. Any of a number of reasons may exist for such a change. For example, a vendor may have a new security patch related to a piece of software that is operating on the destination machine 800. When one or more of these particular software package changes are desired, the service provider 201 may want to change the software stack of the various destination machines under its control.

Where the change is very large, service provider 201 may generate a new reference stack at reference machine 700 in the same manner as previously described, and then have that software stack propagated via a network to a destination SSFTD (e.g., SSFTDs 100A-C), such as via a delta patch file sent to the logically protected region of the hard drive of the destination SSFTD.

Referring to FIG. 3, undertaking such a large transfer, however, may not always be desirous, especially where the stack must be transferred to a large number of destination SSFTDs, and/or where the changes are smaller, such as only a few software components in the stack being updated. In such a case, it may be desirable to implement an incremental update. FIG. 3 illustrates an example where an incremental update to the software stack 931 of the destination machine 800 is performed.

In this example, a software installation package, as well as an installation task sequence describing how to install the software installation package, has been received by the destination machine 800 from the reference machine 700 via network 112, and stored in the logically protected region 851 of the hard drive 821. The software package 1091 may be, for example, a new version of a software package already being utilized within the software stack 931 of the destination machine 800, or a brand new component not previously existing in the stack. The new version may be a security patch or other software component. The installation task sequence, also referred to herein as the incremental task sequence, may be a set of instructions for how to install the new software package.

In the example shown in FIG. 3, the incremental task sequence, captured as an Extensible Markup Language (XML) file, and the software package of one or more MSI installers. The .msi installers may include multiple software updates for changes to the software stack 931. In this particular example, only a single change or single software package will be described, for simplicity. The XML file of the incremental task sequence and the one or more .msi installers may be wrapped together inside a single package 1091.

In the example of FIG. 3, to change the software stack 931 so as to include the desired new package 1091, a process for updating the software stack may be performed, as dictated by the incremental task sequence 1091. For this example, package 1091 will be considered to be a new version of a software package associated with the security camera system of the destination machine. To process the change to the software stack 931 in accordance with the incremental task sequence 1091, the destination machine 800 first may be taken out of operation. Such a step may not be a physical move of the destination machine; rather, such a step may be a time where a customer of the destination machine cannot operate the destination machine for some type of self-service financial transaction.

With the destination machine taken out of operation, the incremental task sequence 1091 may specify which software component currently in the software stack 931 to de-install (i.e., the component that is to be replaced). In some examples, software component may have been de-installed. In some other examples, the middle row may show an example of incremental updating, in which the reference machine propagates both the incremental task sequence 1091 and the installation software package to the destination SSFTD via network 112.

Next, the task sequence specifies to re-install the software component using the installation component utilizing the installation software package stored in the logically protected region 851. This result of this incremental update as shown in FIG. 3 as having been replaced with software component 1033b, 935f. In this example, software component 1033b is the new version of the camera security software that was received in the MSI file.

To complete the process, the destination machine 800 is brought back into operation. Now, when a customer utilizes the destination machine, the stack containing the new software package 1033b is being executed.

The incremental change to the software stack 931 operation described with respect to FIG. 3 illustrates a situation where re-imaging, i.e., utilizing the stored image file 891 in the logically protected region 851, was not needed in order to update the software stack 931 and operation of the destination machine 800. However, there may be situations where an incremental update is desired in conjunction with re-installing the software stack from the image stored in the logically-protected region. For instance, the executable version of the stack may be acting unreliably, and so it may be desired to rebuild the entire stack, and then incrementally update that rebuilt stack, from ground up. Such an updating process is referred to herein as a cumulative update process.

In one example, one or more software packages and a task sequence with instructions for performing the cumulative update (also referred to herein as a cumulative update task sequence) has already been received by the destination machine 800 and stored in the logically protected region 851 of the hard drive 821. Thus, as shown by way of example in FIG. 3 on the bottom row, only the cumulative update task sequence may need to be sent from reference machine 700 to the destination SSFTD, via network 112. The package may include a new version of a software package already being utilized within the software stack 931 of the destination machine 800. The new version may be associated with the operating system or some other software component. The task sequence may be a set of instructions for how to install the new software package.

The extensible markup language (XML) file of the cumulative update task sequence and the one or more .msi installers may be wrapped together inside a single package. The MSI installers may include multiple software updates for changes to the software stack 931. To update the software stack 931 so as to include the desired new software package, a process for updating the software stack may be performed in accordance with the cumulative update task sequence that includes re-imaging of the software stack and installation of any incremental updates. Thus, a cumulative update may include performing (1) installation or replacement of the executable stack from the stack image stored in the logically protected region, and (2) performing an incremental update on the re-installed stack. Thus, the cumulative update task sequence may look very similar to the incremental update task sequence, except that one or more additional instructions for erasing the hard drive (except for the logically protected region) and re-installing the software stack from the image, may be included in the cumulative update task.

Once the compound image is created, a differencing of the compound image and an image of the "before" stack (in this example, version 1.0) is performed, which results in a delta patch file that represents the difference between the first and compound images. Such a comparison may determine the software components that are common or shared between the two versions, and may be performed by differencing software. This process of file-by-file comparison may utilize binary delta differencing.

As a result of the delta patching process, two items may be generated. First, the delta patch file representing the difference between the version 1.0 image and the compound image. Second, information referred to herein as a metadata catalog may be generated for use with the delta patch file. This metadata catalog may be separate from or may be included as part of the delta patch file. Additionally, where the metadata catalog is part of the same delta patch file, the metadata catalog may or may not be logically separate from the remainder of the delta patch file, e.g., from the portion of the delta patch file representing the actual changes in the files. The metadata catalog may identify, on a file by file basis, the correlation between a particular file as part of a software component and a version. For example, for three different files, the metadata catalog may indicate that file A is associated with version 1.0 only, file B is associated with both version 1.0 and version 2.0, and that file C is associated with version 2.0 only. As such, a construct may be created that separately identifies common files to both versions, e.g., file B above, and files unique to version 1.0, e.g., file A above, or version 2.0, e.g., file C above.

As a result, an entire new image need not necessarily be propagated to each and every destination machine that needs a major change to its resident software stack. The delta patch file, including or in addition to the metadata catalog file, and a task sequence for utilizing the delta patch file, may be the only information sent over network 112 to the destination machine(s). Because this delta patch file does not necessarily represent common portions between the resident version operating on the destination machine and the new version, the delta patch file sent to the destination machine may be expected to contain less information, and thus likely be smaller in size than would an image of the entire new version of the software stack. Thus, the overall time and resources to change the software stack on the destination machine may be lessened in comparison to completely transmitting a new image of the entire software stack for the new version.

Figure 4:
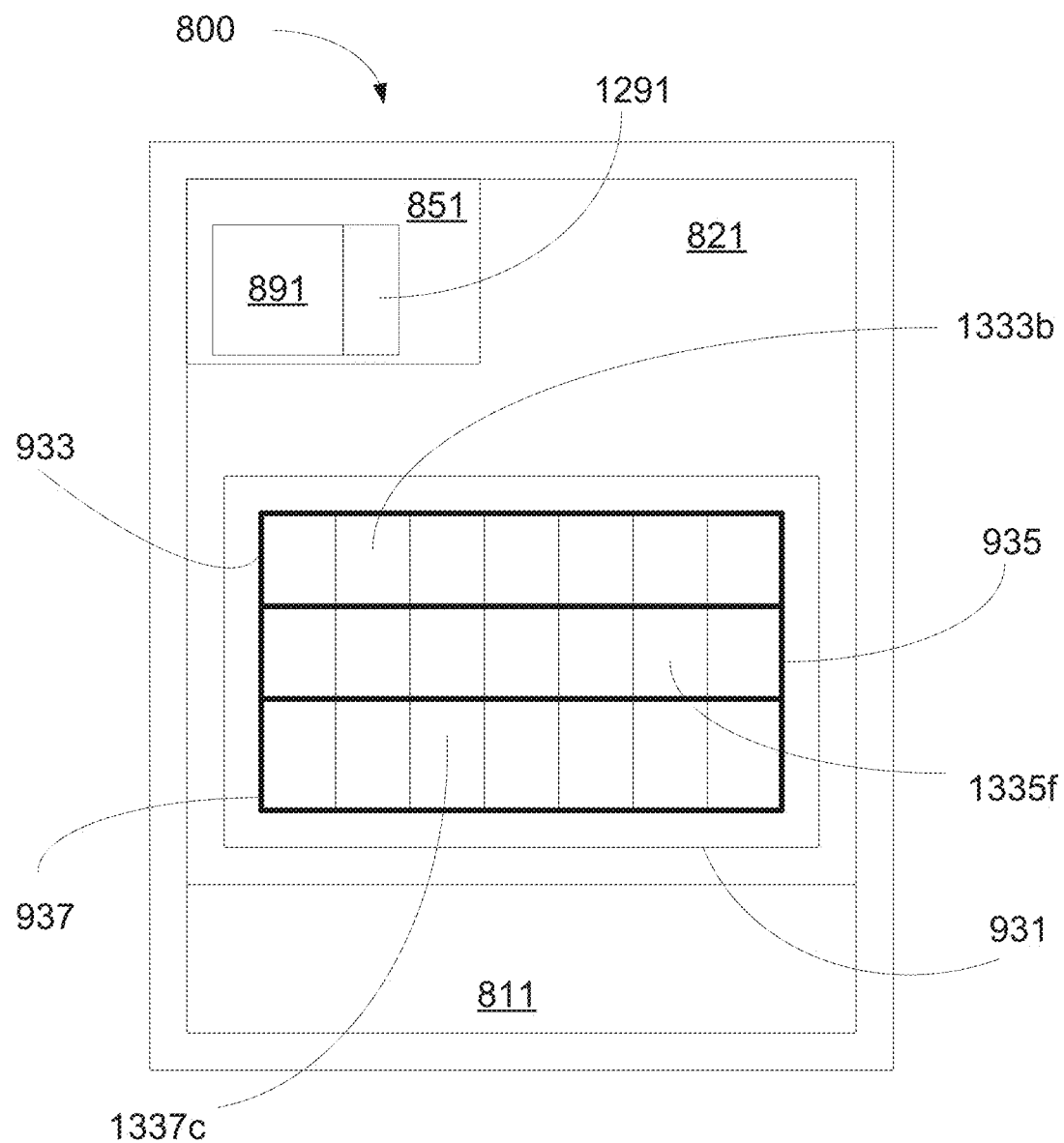
FIG. 4 illustrates an example where implementation of large-scale changes to the software stack of the destination machine, based upon the changes made to the reference machine, is performed.

Referring to FIG. 4, delta patch file 1291 may be transmitted from reference machine 700 to the associated destination machines, such as destination machine 800 in FIG. 4, via network 112 for loading and implementation of the new version 2.0 of the software stack 931. A task sequence including instructions for using the delta patch file 1291 to update the stack local to the destination machine, may also be generated and sent using a software deployment infrastructure, e.g., distribution framework. FIG. 4 illustrates an example where implementation of a large scale change to the software stack 931 of the destination machine 800 is desired.

Similar to the description of FIG. 3, the delta patch file 1291 may be maintained in the logically protected area 851 of the destination machine 800 in addition to the previously-stored stack image and any other previously-stored delta patch files. As previously described, logically protected region 851 of the hard drive 821 provides that when a certain command to clean the hard drive 821 of the destination machine 800 is executed, logically protected region 851 is not erased, modified, or affected. Only the portion of hard drive 821 that is not logically protected would be cleaned. Of course, the entire hard drive including the logically protected region could be erased if truly desired.

However, because logically protected region 851 is not normally erased in the situations described herein, logically protected region 851 may maintain data that will not be expected to be normally removed from the hard drive 821. In the example of FIG. 4, logically protected region 851 maintains original image 891 that represents the original software stack for version 1.0. It is also the current version of the software stack 931 operating on the destination machine 800.

Having received the delta patch file 1291 now stored in the logically protected area 851 of hard drive 821 on the destination machine 800, the patch may be applied to the software image 891 to recreate a compound image file that now contains both versions 1.0 and versions 2.0 of the software stack. Having recreated the compound image in protected region 851, the new software stack may be created onto the destination machine 800. The destination machine 800 may have cleaned the hard drive 821, except for the logically protected region 851. Either version 1.0 or version 2.0 of the software stack that is contained within the compound image may now be copied to the erased disk for the purpose of creating the software stack 931 on the hard drive 821.

Associated peripheral devices of the destination machine 800 then may have been operationally connected to the operating system within the software stack 931. The destination machine 800 may have been configured/personalized for the machine in question, such as serial numbers and other data for devices and components included. The delta patch file 1291, associated task sequence, and metadata catalog may additionally be utilized for installation of the newest version 2.0 of the software stack. The delta patch file 1291 is used earlier to update the image to the compound variant that contains both versions 1.0 and 2.0 of the software stack. Once the image file has been updated to the compound image, then both variants of the software stack are available in the compound image and which of the two is installed is captured in the task sequence.

In the example of FIG. 4, to change the software stack 931 so as to include the desired delta patch file 1291, a process for changing the software stack may occur. For this example, delta patch file 1291 may include the software components associated with version 2.0 for the software stack of the destination machine. As described above, a delta patch file updates the image file contained in 891 to contain a compound image containing versions 1.0 and 2.0. Then during execution of the installation task sequence, the appropriate version is used to install the destination software stack 931. To process the change to the software stack 931, the destination machine 800 first may be taken out of operation. Such a step may not be a physical move of the destination machine; rather, such a step may be a time where a customer of the destination machine cannot operate the destination machine for some type of self-service financial transaction.

With the destination machine taken out of operation, the task sequence for installation 1291 may be accessed to determine the manner for installation. In one example, the task sequence may specify the software components currently in the software stack 931 to de-install. In the example of FIG. 4, software components 933b and 937c, may have been de-installed.

Next, the task sequence may specify to re-install the software components utilizing the software package 1291 stored in the logically protected region 851 that was previously received by the destination machine 800. This change is shown in FIG. 4 as software components 1333b, 1335f, and 1337c. To complete the process, the destination machine 800 is brought back into operation. Now, when a customer utilizes the destination machine, the new software components 1333b, 1335f, and 1337c are being utilized.

In yet another example, a method for installing a new version of a software stack at a destination machine is disclosed. The delta patch file may represent changes to software components for use in rebuilding the current software stack of the destination machine, a metadata catalog identifying, on a file by file basis, the correlation between a particular file as part of a software component and a version, and a task sequence for installation of a desired software stack on the destination machine. The task sequence may be part of the delta patch file or separate from the delta patch file. As described above, after application of the received delta patch file, the image stored in the logically protected region of the hard drive now may contain an additional logical version of the software stack, e.g., if the image contained just version 1.0 of the software stack prior to application of the delta patch file, then it will contain both versions 1.0 and 2.0 after application of the delta patch file. Repeating the process, if a subsequent delta patch file is distributed and applied, the image in the protected region of the hard drive will now contain three versions of the software stack, e.g., versions 1.0, 2.0 and 3.0.

The task sequence may be accessed to determine the instructions for changing the current software stack operating on the destination machine. As part of the instructions of the task sequence, the destination machine may be rebooted into a memory (e.g., RAM)-resident operating system. By rebooting in the memory-resident operating system, the hard drive of the destination machine may be cleaned. The entire hard drive may be cleaned except for the logically protected region of the hard drive. By cleaning/erasing the hard drive, but for the logically protected region, an entirely new software stack may be built on the destination machine.

A software stack may be built in the erased portion of the hard drive from the patched image stored in the logically protected region of the hard drive based upon instructions in the task sequence as to the version to build. For example, the patched image may include multiple versions of a software stack. The task sequence instructions may indicate to build version 2.0 that is included in the patched image. As such, version 2.0 of the software stack may be built as the software stack of the destination machine. The instructions of the task sequence may instruct the destination machine to be rebooted into the newly-built operating system of the software stack.

At this point, the software stack of the destination machine may be operating under the specific version identified in the task sequence, such as version 2.0. The task sequence may include additional instructions for de-installing any identified software component(s). In upgrading to a version 3.0, for example, a determination may be made as to the software components common to version 2.0, currently in operation, and version 3.0, the desired version to be loaded, as well as the software components for version 3.0 only. Those software components for version 3.0 only may be identified and, the corresponding software components for version 2.0 may be de-installed. The identified software components for version 3.0 only may then be re-installed in place of the de-installed version 2.0 software components. The software stack of the destination machine may operate in accordance with the desired version, such as version 3.0. This de-installation and reinstallation of individual components that occurs during incremental and cumulative updates is driven by the composition of software manifests. A delta patch file provides for the efficient distribution of change and to allow for updating the image file on a destination machine.

In another example, a delta patch file may be generated for reducing the number of versions of a software stack maintained on destination machines. In one example, a delta patch file may be generated when there is a desire to reduce the number of versions of a software stack currently maintained on a destination machine in the field. Any of a number of reasons may exist for reducing one or more versions of a software stack included in an image in a destination machine. In one example, a flaw in a version of the software stack that was previously distributed to the destination machine and saved in an image on the destination machine may be found and there may be a desire to completely remove the version from the destination machine. Another reason for reducing the number of versions stored at a destination machine may be due to limited data storage capacity at the destination machine. Thus, where some earlier versions of the software stack are likely no longer needed, it may be desirable to free up storage space by removing those earlier versions.

Generating Task Sequences and Their Use in Propagating Reference Stack Updates. As has already been discussed, a current version of the reference stack may be generated at reference machine 700, which may then be propagated out to the SSFTDs in a number of different ways. To accomplish this, the SSFTDs will need not only the stack updates (e.g., in the form of images, delta patch files, and/or installer components, depending upon the type of update), but also instructions as to how to make those updates locally at the SSFTDs. The present section will discuss those instructions, also referred to herein as task sequences, in greater detail. In addition, this section will discuss another task sequence, called herein a reference stack task sequence, for building the reference stack at reference machine 700. Moreover, as will be discussed, any or all of these task sequences may be generated in an automated manner to potentially reduce or even minimize human interaction (and the corresponding opportunities for human error). This may be desirable where updates occur frequently and providing a large software update team to create the task sequences and build the updated versions of the reference stack is simply not economical.

Returning again to a brief description of the software stack, the reference software stack on the reference machine (and subsequently propagated to and installed on the SSFTDs) may be a multilayered composition comprising an operating system, a device management layer, an application layer, and miscellaneous software applications to support maintenance, software distribution, monitoring and security. It may be expected that the service provider itself is not necessarily qualified to generate all of the software components that make up these layers, and/or it would not be efficient for the service provider itself to generate the software components directly. Accordingly, it may be expected that some or all of the software components may originate from multiple different vendors. For example, a first vendor may provide device management components (e.g., XFS) while a second vendor may provide components in the application layer.

The composition of a fully constituted software stack may be effected using, for example, a readily, commercially-available MDT, to orchestrate the installation of each component on the target system. The MDT may provide a graphical user interface (GUI) for creation and modification of task sequences, but may not be well-suited to making large scale repetitive updates such as those provided by the various vendors during each release cycle. Making those updates via a GUI may be simply too time consuming and error prone. Instead, software deliveries from our vendors may be accepted in a highly regularized format, and certain task sequences may be programmatically created and/or updated in accordance with those deliveries. For instance, vendors may deliver three specific artifacts (e.g., in the form of data stored on a computer-readable medium) with every software release:

1) Software components—these may be delivered, for example, in .msi installer file format.
2) Documentation—this may characterize what is new with each release and what is used to drive testing.
3) Manifests—these are documents that may describe the order in which components should be installed, the commands used to carry out the installation, and in some cases, expected environmental preconditions such as which operating system services should be started or stopped for the installation to proceed properly.

These artifacts may be processed so as to generate a task sequence for fully building the software stack on the reference machine from scratch. The task sequence may be a set of instructions, such as computer-readable instructions (e.g., XML format), and may be generated manually and/or automatically. This reference stack task sequence may include instructions for installing each of a plurality of software components, one by one, in a particular order into the software stack on the reference machine.

The manifests, software installer components, and documentation may be used to programmatically generate the reference stack task sequence in the following example manner. For each software component in the stack, the MDT development environment on the reference machine may track the associated installer component, the associated application meta-data file (which may be, e.g., an XML file), and the order in which the software component should be installed relative to the other software components. The following sequence of events may thus be executed programmatically to update a pre-existing reference stack task sequence (or for creating a new reference stack task sequence from scratch).

First, a validation check may be performed. The reference machine may be configured to programmatically iterate across each vendor-provided manifest and compare the version number captured in the manifest with the version number embedded in the accompanying .msi files. This is because version numbers are captured in two places and it is desirable to check that the versions are consistent.

Next, the MSI file may be copied to the MDT's file share inside a folder with the same name as the component. Then, a programmatic update may be made to the MDT's applications metadata file to capture application metadata. Where a pre-existing reference stack task sequence is to be updated, a comparison of that reference stack task sequence and the manifests may be performed, to determine the changes that need to be made to the reference stack task sequence. Where a new reference stack task sequence is to be created from scratch from the manifests, then the comparison may be skipped.

If a new reference stack task sequence is to be created, then it is created based on the manifests. If a pre-existing reference stack task sequence is to be updated, then based on the changes determined during the comparison, an update may be made to the reference stack task sequence by modifying portions of the reference stack task sequence. For instance, where the component already exists, the update for that component may be made be "in-place." Or, where the reference stack task sequence (e.g., an XML file) contains more components that those described in each vendor provided manifest, the manifest processing may first excise the relevant vendor instructions (thus deleting them from the task sequence) and then replace them with a new set, leaving all other instructions in place. Or, where additional components are to be added, corresponding instructions from the manifests are added to the reference stack task sequence.

Once the reference stack task sequence has been generated, the reference machine 700 may execute the reference stack task sequence to build the reference stack. The reference machine 700 may also store the task sequence as data on a computer-readable medium.

Once the reference stack has been built, there are several ways of propagating the current software stack to the SSFTDs, depending upon the significance of the changes to the software stack as compared with the previous version of the software stack, as well as the current state of a given SSFTD. In general, the current software stack may be propagated out to a given SSFTD in at least one of two ways: (1) sending an image of the full software stack, or sending a file representing changes to the full software stack as compared with the previous version of the software stack; and (2) sending the .msi installers for those software components that have been removed, added, or modified. Using the first method (sending image of software stack or file of the changes), it may or may not be assumed that the target SSFTD already has a viable image of the previous version of the software stack. Using the second method (sending the .msi installers of just the affected components), it is assumed that the target SSFTD in fact has a viable image of the previous version of the software stack.

For each of the above two methods, a task sequence for use by the target SSFTD may also be generated and sent to that SSFTD. That task sequence instructs the SSFTD how to use the image, file, or .msi installers being provided. Depending upon the propagation method used, there may be three types of such task sequences sent to the SSFTD: (A) a re-imaging task sequence for instructing the SSFTD how to build a software stack using the image or file being sent; (B) an incremental task sequence for instructing the SSFTD how to modify the existing software stack in the SSFTD using the .msi installers being sent; and (C) a cumulative task sequence for instructing the SSFTD how to re-build its software stack from an existing image of the software stack and to then utilize the .msi installers. Thus, the re-imaging task sequence may be used with method (1) above, and the cumulative and incremental task sequences may be used with method (2) above.

Not only may the reference stack image for use by the reference machine 700 be programmatically created from the manifests, but so may any task sequences needed for the incremental update function and the cumulative update function, for use by the SSFTDs.

For the incremental update task sequence, as with the reference stack task sequence, the MDT environment may also be updated programmatically with reference to manifests. A difference in this case is that the desired incremental task sequence is generated with reference to two different sets of manifests—one representing the desired state of the reference software stack, and the other representing the state in which the reference software stack currently resides. Programmatic analysis of the two manifests (previous state versus desired state) may allow the differences thereof to be decomposed into three distinct categories:
  a) Components that exist in the new set of manifests, but not the old set of manifests. These are new components that will need to be installed on the SSFTDs during the update.
  b) Components that exist in the old set of manifests, but not in the new set of manifests. These are components that will need to be de-installed from the SSFTDs during the update.
  c) Components that exist in both sets of manifests, although with different version numbers of the components. These are components that will need to have the old version de-installed, and then the new version installed, on the SSFTDs during the update.

This basic analysis yields two sets of components—those that need to be de-installed, and those that need to be installed. These two lists may be further processed so that the incremental task sequence file is updated to execute the de-installations first (taking care to do so in the reverse order they are expressed in the previous-state manifests), then executing the installations in the order they are expressed in the desired-state manifests.

For the cumulative update task sequence, this is a task sequence that is a hybrid sequence that first re-images the SSFTD to a known software stack version, using an image that has been previously deployed to the SSFTD, and then updates the SSFTD incrementally in the same manner as the incremental update task sequence, again using installer components that have either been previously deployed or are sent along with the cumulative update task sequence.

The basic analysis is very similar to that used to generate the incremental update task sequence. In particular, the creation is performed by comparing the manifests that characterize the desired software revision level and generating a set of instructions that de-install, and then install, software components. The logistics of determining what components are de-installed and installed are essentially the same as described above with regard to the incremental update task sequence. There is a difference, however, in that the cumulative update task sequence also handles installing and configuring the base stack image prior to performing the incremental update function.

Figure 5:
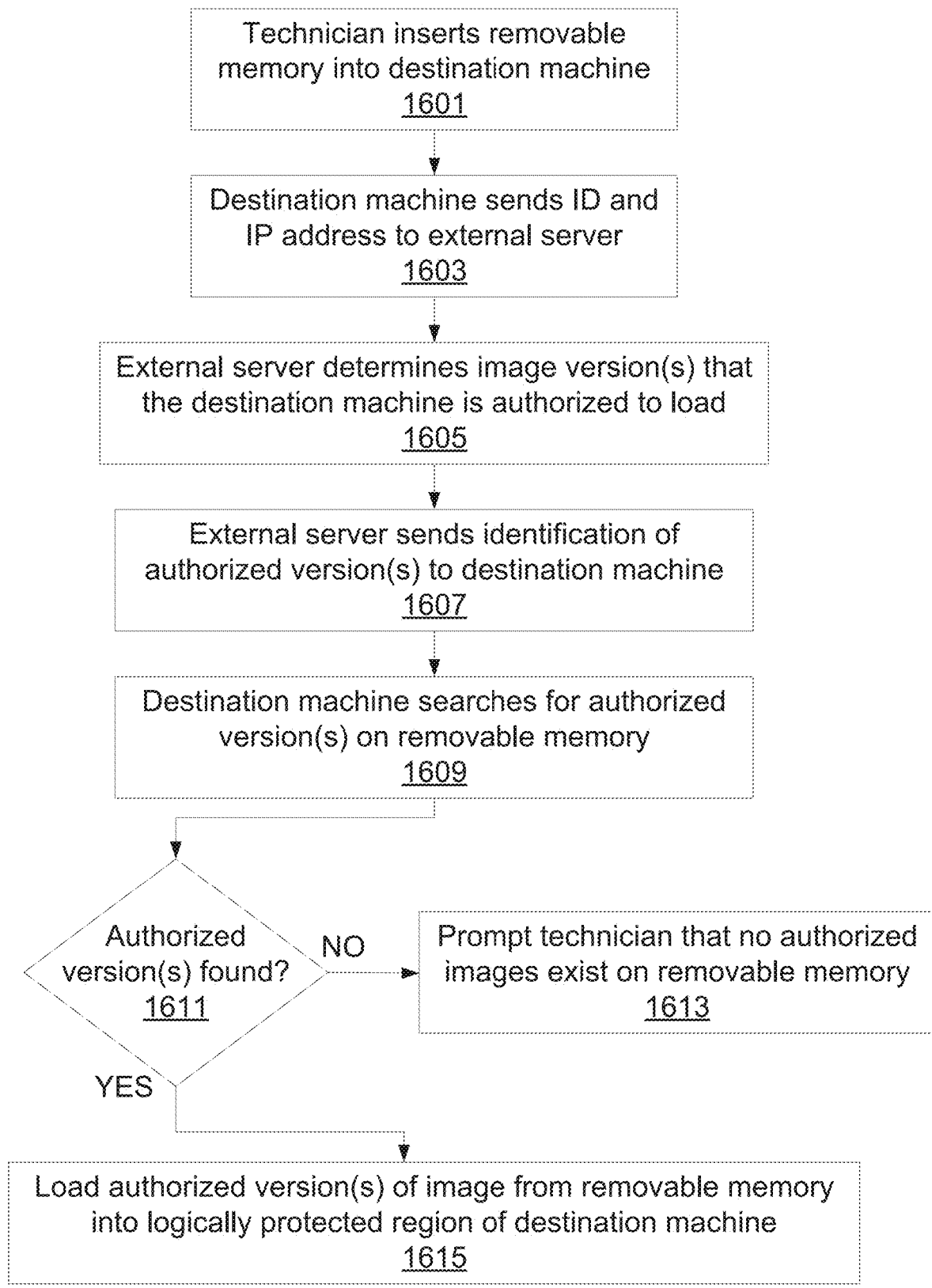
FIG. 5 is an example flowchart of a method for authorizing loading of a new version of a software stack image onto a destination machine.

FIG. 5 is an example flowchart of a method for authorizing loading of a new version of a software stack image onto a destination machine. The process starts and at 1601, a technician present at the destination machine inserts a removable memory source into the destination machine via a connection port. At 1603, whether entered by the technician or determined by the destination machine, the destination machine may send identification of the destination machine to an external server. Such identification may include a serial number and/or an IP address associated with the destination machine.

At 1605, the external server may determine the one or more version(s) of images that the destination machine is authorized to load onto its logically protected region. Such a server may be logically protected region may be logically protected region. Proceeding to 1607, the external server may send identification of the authorized version(s) of images to the destination machine. In 1609, the destination machine may search for the one or more authorized version(s) of images on the removable memory source inserted by the technician in 1601.

A determination then may be made at 1611 as to whether one or more of the authorized version(s) of images are present on the removable memory source. If no authorized version is found, at 1613, the technician may be prompted that no authorized versions of images exist on the inserted removable memory source. If no authorized version of an image is found on the removable memory source, no image on the removable memory source can be loaded onto the logically protected region of the destination machine. Returning to 1611, if one or more authorized versions of images is found on the removable memory source, at 1615, the one or more authorized versions of images may be copied form the removable memory source to the logically protected region of the destination machine for eventual loading of a software stack on the destination machine.

In another example embodiment, a technician may update task sequence data for a plurality of images, even if not utilized and/or authorized for the destination machine that the technician has connected the removable memory source to. For example, after connecting a removable memory source, the destination machine may identify at least one unauthorized version of the image of the software stack that is on the removable memory source. While accessing an external server to request a current task sequence for execution at the destination machine, another request may be made for a current task sequence for execution of the at least one unauthorized version of the image of the software stack. Then, the destination machine may receive data representative of the current task sequence for execution of at least one unauthorized version of the image of the software stack. Finally, the destination machine may record the data representing the current task sequence for execution of at least one unauthorized version of the image of the software stack to the removable memory source. As such, the destination machine may be utilized for updating task sequences of unauthorized versions of the image for a technician to use on other destination machines without the destination machine having access to the unauthorized version of the image of the software stack.

Install File Size Optimization and Installation Verification System

In general, the information technology (IT) life cycle of a software application may be depicted as comprising the following phases: requirement gathering, to requirement validation, to source validation, to IT engineering, to internal testing, and then to user acceptance testing (UAT). In the IT engineering phase, significant challenges arise in automating the process of installing a large application that may have varying configurations across a large number of users. Technological advancements in application configuration (ACT) and management of large application (i.e., huge app management) are desirable.

Figure 8:
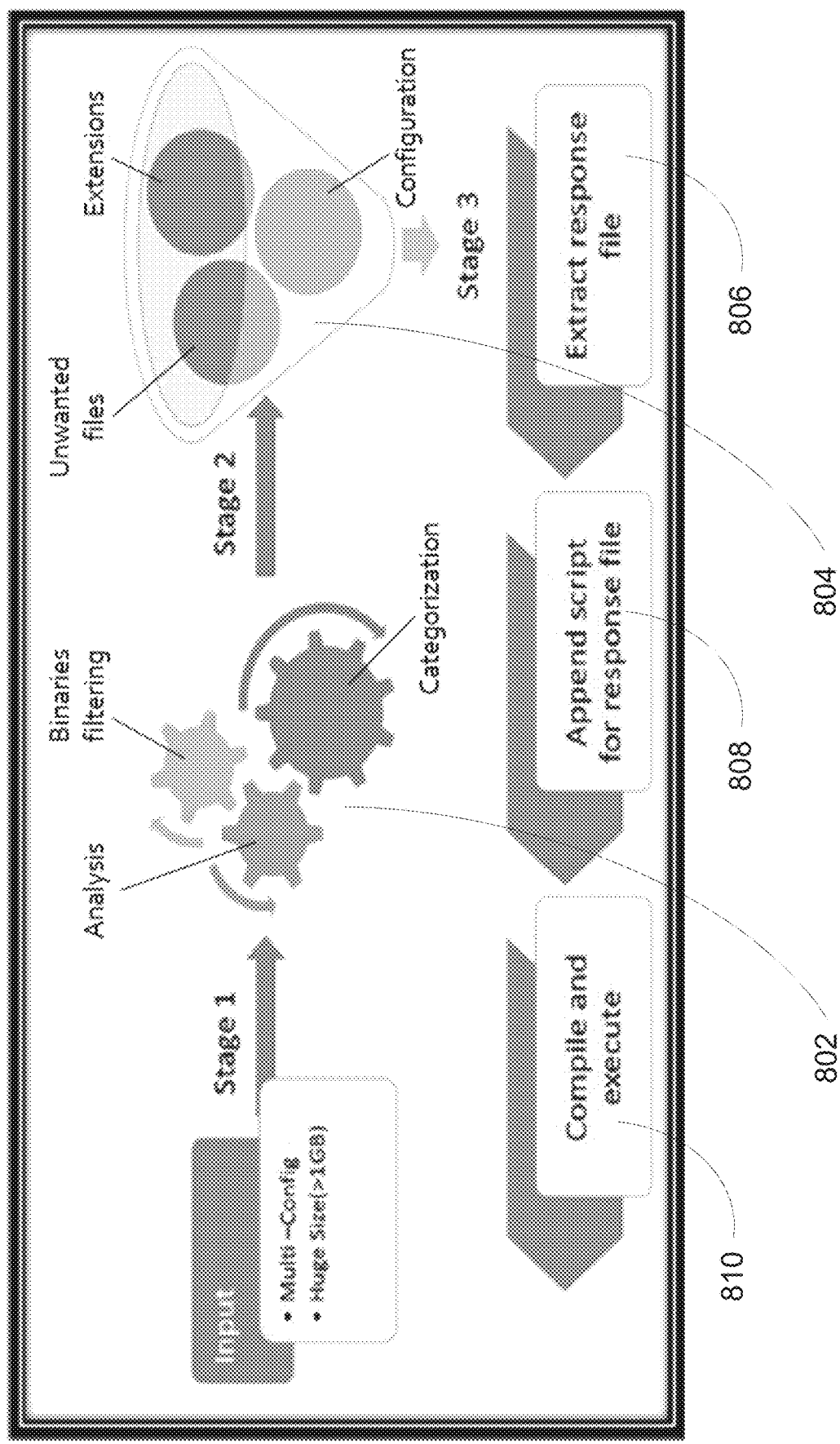
FIG. 8 illustrates various method steps organized into stages as one example in accordance with aspects of the disclosure.

FIG. 8 illustrates one example in accordance with aspects of the disclosure, in which at least the aforementioned technological advancements over existing practices can be found in the method steps depicted in the figures. Various method steps may be described as occurring at stage 1, stage 2, in the transition from stage 1 to stage 2, and the other steps depicted in FIG. 8.

Figure 6:
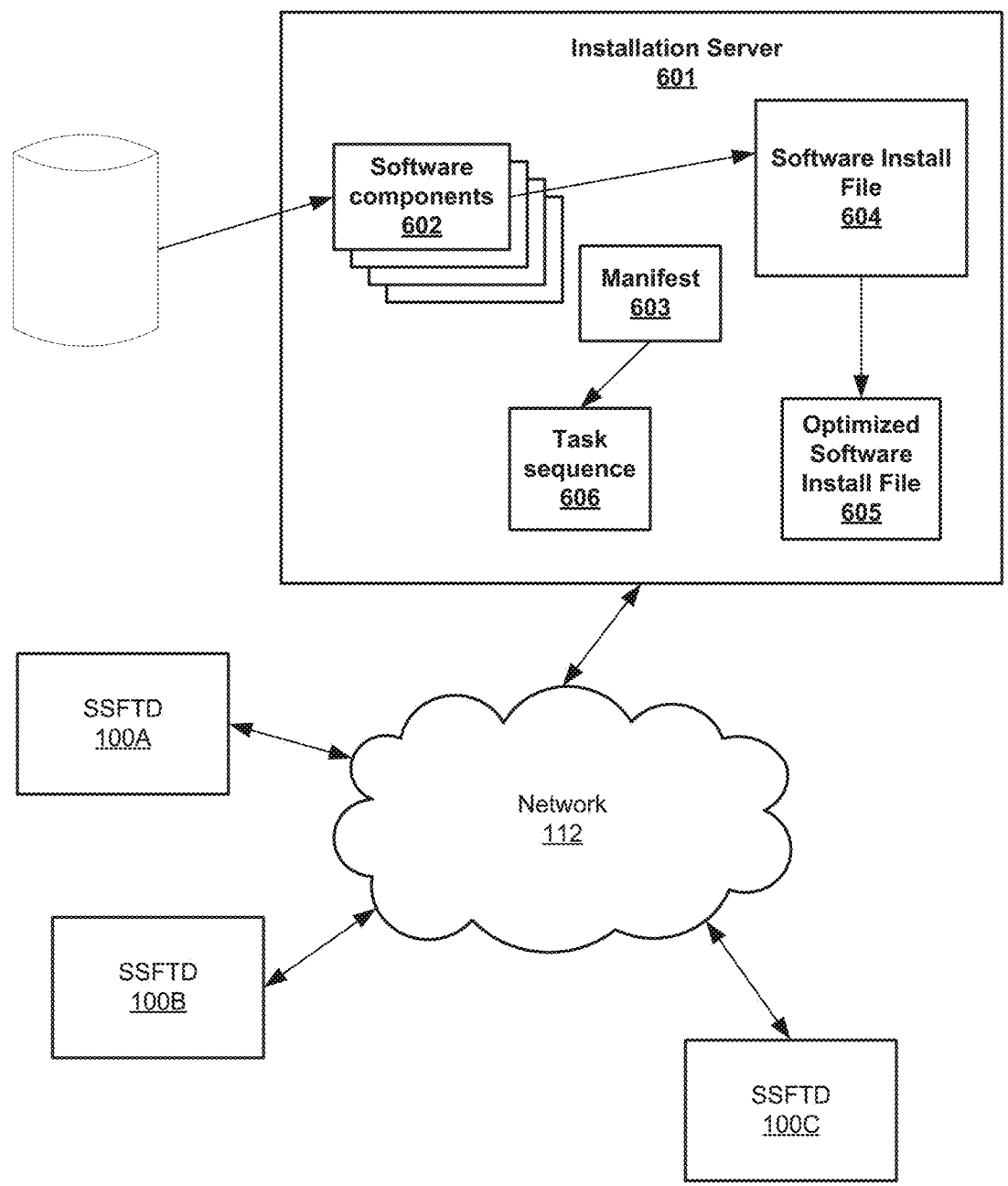
FIG. 6 is an illustrative functional block diagram of a system including a plurality of SSFTDs and an installation server interconnected via a network in accordance with various aspects of the disclosure.

In stage one, various steps of processing one or more source file(s) using a novel tool are illustrated in FIG. 8. The steps 802 in stage one may be performed by a processor of an installation server 601, as illustrated in FIG. 6. The processor may access a multi-configuration template script (e.g., a Wisescript file) and a source file. In some examples, the source file is greater than 1 gigabytes in size, but in other examples, the source file may be a smaller or a different size. In any event, as shown in FIG. 6, as a result of an optimization being performed on the original source file 604, the resulting, optimized source file 605 will be smaller in size than the original source file. In one example, a forty gigabyte source file is automatically optimized by the process in FIG. 8 to a smaller, optimized 7.5 gigabytes. The technological improvements from such an optimization are multi-fold because it enhances the pervasive installation of software and/or software upgrades (e.g., patches) to a network of computing devices.

Continuing with the steps in stage one, the processor in the installation server 601 may perform analysis, categorization, and/or binaries filtering (as illustrated in FIG. 8). For examples some steps performed in stage one may include, but are not limited to:

- Post analyzing the fact on configuration or huge size the source may be processed through aspects of the apparatus in accordance with this disclosure.
- Aspects of the apparatus in accordance with this disclosure filters standard formats which can be omitted (pre-defined extensions).
- Post that the apparatus, in accordance with aspects of this disclosure, will help remove the pre-requisites that may have been added as part of the source by specific search on the application name versus the dependents.
- Upgrade for previous release.
- Source installation\uninstallation steps.
- Specific instructions (grant permission\delete files\remove folders\and the like).
- Publish application or all shortcuts.
- All or some of this may be updated in an answer file (e.g., response file).

In one example, the answer file creation and app configuration process may include numerous steps. The configuration file may contain complete configurations like application vendor, name, version, build and also section to categorize the region specific information/configuration details about the vendor source that should be appended with standard executable. The executable may contain the code to read the value from answer file (e.g., response file) and execute accordingly for install\uninstall, upgrade and testing purposes.

The source file may comprise numerous software components 602, as shown in FIG. 6.

In particular, the creation of the optimized source file 605 is performed by comparing the manifests 603 that characterize the desired software revision level (e.g., and which software components 602 of the pool of components) to include in the optimized file, and generating a set of instructions that de-install, and then install, software components 602 on the SSFTD 100A. IT users may create an answer file that is automated, where answer file has complete/nearly complete information about the application configuration. When an application is installed region wise and has to interact with local servers it may be configured accordingly.

One example of a multi-configuration template (e.g., wisescript file) may include excerpts as follows:

```
Rem ****** For XYZ Variable ******
READ INI Value from %INST%\Install.ini into Variable XYZ__Share
READ INI Value from %INST%\Install.ini into Variable XYZ__Arg
Set Variable XYZ__Share to %XYZ__Share%
Set Variable XYZ__Arg to %XYZ__Arg%
Rem ****** For ABC Variable ******
READ INI Value from %INST%\Install.ini into Variable ABC__Share
READ INI Value from %INST%\Install.ini into Variable ABC__Arg
Set Variable ABC__Share to %ABC__Share%
Set Variable ABC__Arg to %ABC__Arg%
```

The XYZ may correspond to a particular geographic region, while ABC may correspond to a different region. As such, the multi-config template permits the installation server to customize/tailor the original source file into a custom, optimized source file that is smaller in size than the original source file. For example, a computing device of a user in Europe may have different regulatory/compliance requirements than another user of a computing device located in Asia, even though both users may be affiliates/subsidiaries of the same parent organization.

In accordance with various aspects of the disclosure, an illustrative "Install.ini" file used with a Wisescript might include at least some of the following content:

```
APPTITLE=<xxx>
PRODUCTVERSION=1.1
BUILDERVER=001
MANUFACTURER=<xxx>
Silent__CMDLINE=/S /v/qn
DESKTOPSHORTCUT=0
INSTALLDIR=C:\Program Files\<xxx>
STARTMENUSHORTCUT=1
LOGFILENAME=C:\Program Files\<xxx>
REBOOT=NO
```

The name-value pairs in the configuration file (e.g., "install.ini") may be used to initialize and configure the system to function and operate as described herein.

In stage two, various steps using a novel tool are illustrated in FIG. 8. The steps 804 in stage two may be performed by a processor of an installation server 601. The processor may generate a script, which comprises part of the task sequence 606, to assist in installation of the optimized software install file 605 at a remote user computing device, such as a SSFTD 100A.

Continuing with the steps in stage two, the processor in the installation server 601 may perform additional steps on unwanted files, extensions, and/or configurations based on part of the optimization performed in stage one 802. Moreover, stage two may further include steps of filtering the install file and creating post-reboot scheduling:

- The source may be further filtered basing on file extensions and configuration where it reads from the "install.ini" file and records the same.
- For post-reboot, the application may be attached with the aforementioned script for it to manage the system setting through task scheduler.
- At this juncture if any user related registries are to be configured, the application calls the specific script recorded in/associated with the answer file.

In one example, an answer file (e.g., response file) may be created using executable instructions on the installation server 601. For example, "Create_ResponseFile.exe" may include required configurations about a legacy installer. Once install.ini is created (as shown herein), setup.exe may read complete application information from the answer file and install it silently (e.g., automatically) in one go. In one example, the installation server 601 creates a folder with a particular naming convention, then copies all the install\source files like legacy executable, file, folders, registries, and the like that should be wrapped and complied to generate a single setup.exe executable file. In some examples, executable file also upgrade older version if exist on the users machine by reading the version number inside the OLD_APPS folder. For example, upgrade commands/instructions may be used to upgrade the previous releases based on the folder structured created under an OLD_APPS folder that resides along with main setup.exe. When Setup.exe is executed, it fetches older versions from OLD_APPS folder and upgrades it to newer version, using for example code as follows:

```
Get Registry Key
HKEY_LOCAL_MACHINE\SOFTWARE\***\XYZ.Config.ABC\%OLD_PRO
DUCTIONVERSION1% place in Variable OLD_REGCHECK
If OLD_REGCHECK Equals "1" then
    Execute
%INST%\%OLD_APPS\%OLD_PRODUCTVERSION1%\Setup.exe
/UNINSTALL /S (Wait)
End
Get Registry Key
HKEY_LOCAL_MACHINE\SOFTWARE\***\XYZ.Config.ABC\%OLD_PRO
DUCTIONVERSION2% place in Variable OLD_REGCHECK
If OLD_REGCHECK Equals "1" then
    Execute
%INST%\%OLD_APPS\%OLD_PRODUCTVERSION2%\Setup.exe
/UNINSTALL /S (Wait)
End
```

In accordance with various aspects of the disclosure, once answer file is created, a cross-check may be performed to confirm that the required configuration settings are created with the help of an executable file (e.g., Create_ResponseFile.exe). Then this answer file may be placed along with setup.exe, such that when setup.exe is executed, it will read complete configuration from the answer file for unattended installation. For example, some of the following commands may be executed accordingly:

Read INI Value from %INST%\Install.ini into Variable APPTITLE
Set Variable APPTITLE to %APPTITLE%

In addition, post-reboot system configuration may be incorporated into the optimized software install file 605. In one example, a "schtasks.exe" command-line interface utility installed on a user computing device (e.g., SSFTD 100A) allows an IT user (e.g., administrator) to create, delete, query, change, run, and/or end scheduled tasks on a local or remote system through the command shell. Some examples of operations available through the scheduled tasks command-line interface utility include, but are not limited:

- schTasks.exe performs the same operations as scheduled tasks in the operating system's Control Panel. These tools may be used together and/or interchangeably. In some examples, Schtasks replaces At.exe, a tool included in previous operating system versions. Although At.exe is still included in some operating system versions, schtasks offers better functionality for a command-line task scheduling tool.
- The parameters in a schtasks command may appear in any order. Meawhile, executing schtasks without any parameters performs a query.
- Permissions for schtasks may be as follows, however, in some examples, the permissions may be different to accommodate higher or lower security restrictions:
  - In some examples, only a user with permission may run the command. Any IT user may schedule a task on the local computer, and they can view and change the tasks that they scheduled. Members of the administrators group can schedule, view, and change all tasks on the local computer.
  - To schedule, view, or change a task on a remote computer, in some examples, the IT user must be member of the administrators group on the remote computer, or you must use the /u parameter to provide the credentials of an administrator of the remote computer.
  - An IT user may use the /u parameter in a /create or /change operation only when the local and remote computers are on the same domain or the local computer is in a domain that the remote computer domain trusts. Otherwise, the remote computer cannot authenticate the user account specified and it cannot verify that the account is a member of the administrators group. In other examples, the aforementioned restriction may be ameliorated.
  - In some examples, the task must have permission to run. The permissions required vary with the task. By default, tasks run with the permissions of the current user of the local computer, or with the permissions of the user specified by the /u parameter, if one is included. To run a task with permissions of a different user account or with system permissions, use the /ru parameter.

To verify that a scheduled task ran or to find out why a scheduled task did not run, the installation server may access a memory of a user computing device (e.g., SSFTD 100A) to retrieve a task scheduler service transaction log (e.g., SystemRoot\SchedLgU.txt). This log records attempted runs initiated by all tools that use the service, including Scheduled Tasks and SchTasks.exe.

On rare occasions, task files become corrupted. Corrupted tasks do not run. When the computing device tries to perform an operation on corrupted tasks, SchTasks.exe may display the following error message: "ERROR: The data is invalid." Corrupted tasks might not be recoverable. To restore the task scheduling features of the system, SchTasks.exe or Scheduled Tasks may be used to delete the tasks from the system and reschedule them.

In some examples, a batch file (e.g., .bat extension) may be created, as illustrated below, and is called along with the source where the message is appended in the answer file:

```
setlocal
set runlevel=
REM Get OS version from registry
for /f "tokens=2*" %%i in ('reg.exe query
"HKLM\SOFTWARE\Vendor\OS\CurrentVersion" /v "CurrentVersion"') do set
os_ver=%%j
REM Set run level (for XYZ or later - version 6)
if/i "%os_ver:~,1%" GEQ "6" set runlevel=/rl HIGHEST
REM Execute SchTasks.exe
schtasks.exe /create /tn "Task Name" /sc ONSTART /TR "Path of the script or
exe" /ru SYSTEM %runlevel%
```

In stage three, various steps using a novel tool are illustrated in FIG. 8. Step 806 includes extracting a response file (e.g., answer file) at the installation server 601. Then, in step 808, a processor of the installation server 601 appends a script (e.g., task sequence) for the response file. Finally, the installation server 601 compiles everything into a single executable file (e.g., "setup.exe") that is sent to a user computing device, such as SSFTD 100A. A processor at the user computing device executes, in the step 810, the setup.exe file to cause installation of the optimized software install file 605 at the device.

Continuing with the steps in stage three, in one example, the processor in the installation server 601 may perform steps of compiling the files into a readily executable format:

The optimized software install file (e.g., optimized source) along with the answer file (e.g., response file) may be processed using tools to append the data The file may be then complied to generate an end result The executable which is created (e.g., "setup.exe") is smaller than the actual source and may be used for multi-configurations.

In another example, a script may be used to manage changes in user registry in a system context as follows:

```
On Error Resume Next
    Set WshShell = CreateObject("WScript.Shell")
    Set objFSO = CreateObject("Scripting.FileSystemObject")
Const HKEY_USERS = &H80000003
Set objShell = CreateObject("WScript.Shell")
strComputer = "."
ExcelIntVer = 0
Set oReg=GetObject("winmgmts:{impersonationLevel=impersonate}!\\" & _
strComputer & "\root\default:StdRegProv")
strKeyPath = ""
oReg.EnumKey HKEY_USERS, strKeyPath, arrSubkeys
For Each objSubkey In arrSubkeys
```

```
    FindOpenkeys HKEY_USERS, objSubkey
Next
Function FindOpenkeys(HKEY_USERS, strKeyPath)
Set wshShell = CreateObject("WScript.Shell")
""""" CHANGE HERE """
strRegistryKey =strKeyPath & "\Software\Abc"
strStringValueName ="xyz"
strValue = 1
oReg.CreateKey HKEY_USERS , strRegistryKey
oReg.SetSTRING Value HKEY_USERS , strRegistryKey, strStringValueName,
strValue
""""UP TO HERE"""""
Set wshShell = Nothing
End Function
```

In one example, once an IT user is assigned with application request with legacy vendor source, then next approach for the IT user is to understand complete configuration steps (e.g., create or remove directory/files, create shortcuts, edit registries, add upgrade for previous releases, grant permission to the users, and the like). A pre-defined automation tool may be used to create answer files (e.g., response files) based on the configuration settings herein to perform all IT engineering actions for making successful installation.

Figure 7:
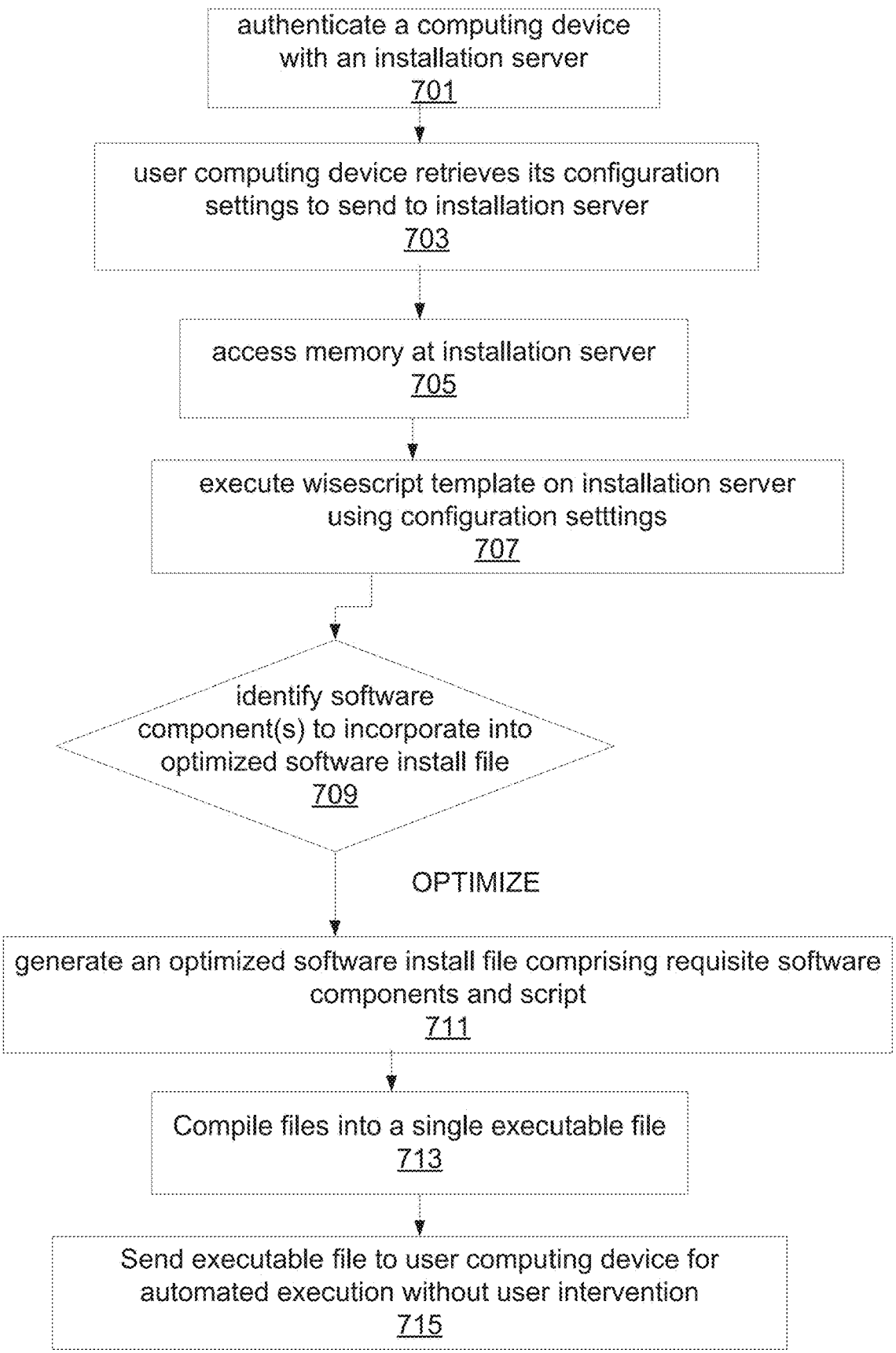
FIG. 7 is an example flowchart of a method for optimizing a software install file for installation at a destination machine in accordance with various aspects of the disclosure.

Referring to FIG. 7, in one embodiment, a system is described for optimizing a software install file size and verification installation of the file on a user computing device, such as a self-service monetary device (SSFTD). The user computing device may communicate over a network 112 with the installation server 601 and authenticate (in step 701) with the server. The authentication may involve confirming that the computing device is authorized to receive a software update from the installation server so that the SSFTD may later automatically download over the network 112, an optimized software installation file. The size of the software installation file may be optimized by an installation server machine to be a smaller size than an unoptimized software installation file.

Continuing with the example in FIG. 7, the installation server may establish communication over a network with a SSFTD and then automatically analyze the environment of the SSFTD (in step 703) by, inter alia, accessing configuration settings of the SSFTD. These configuration settings of the SSFTD may be transmitted to the installation server for storage in its memory (see step 705) so that they are available for comparison against a template file. In response to detecting a predetermined configuration value in the configuration settings of the SSFTD (in step 707), the installation server may download to a memory of the installation server, a plurality of software components identified in an updated first manifest (in step 709). In step 709, the installation server 601 may update a first manifest 603 by removing a first one of a plurality software components identified in the first manifest. As such, the installation server generates an optimized software installation file 605 using the updated manifest and the plurality of software components identified in the updated manifest. See step 711. In addition, the installation server 601 may generate a task sequence comprising a set of instructions for installing software install file on the SSFTD.

In some examples, to further streamline the automated installation, the installation server may in step 713 compile the files into a single executable file (e.g., a setup.exe file) before sending to the SSFTD. Finally, the installation server transfers (e.g., transmits) the task sequence and the optimized software installation file to the SSFTD for execution on a software stack residing on the SSFTD. See step 715.

In accordance with various aspects of the disclosure, the apparatus disclosed herein may enable performance of at least the below actions:

Install\Remove file
Trigger executables
Create\Remove directories
Upgrade for the previous release
Edit registries
Create shortcuts
Custom Actions
Grant user permissions
Edit INI Files
Test successful installation
Check the validation part
Industry standards

CONCLUSION

While various illustrative embodiments are specifically shown and described, it will be understood by those skilled in the art that the present disclosure is not limited to these embodiments. Modifications may be made by those skilled in the art, particularly in light of the foregoing teachings. For example, each of the elements of the aforementioned described embodiments may be utilized alone or in combination or subcombination with elements of the other embodiments. It will therefore be appreciated and understood that such modifications may be made without departing from the true spirit and scope of the present disclosure. The description herein is thus to be regarded as illustrative, rather than as restrictive, of the present disclosure.

We claim:

1. A non-transitory computer-readable medium storing computer-executable instructions that, when executed by a processor, causes a self-service monetary device (SSFTD) to:

automatically download, to the SSFTD over a network from an installation server, a software installation file, wherein a size of the software installation file is optimized by the installation server to be a smaller size than an unoptimized software installation file;

receive, by the processor in the SSFTD, data representing a first manifest, wherein the first manifest identifies at least some of a plurality of software components;

determine a first one of the software components that is identified by, but not part of, the first manifest;

request transfer, by the SSFTD, of the first one of the software components to the SSFTD;

generate, by the SSFTD, an updated task sequence comprising a set of instructions for installing the first one of the software components to a software stack residing on the SSFTD, wherein the set of instructions are generated by the installation server using a scripting template, wherein the set of instructions corresponding to the updated task sequence, when executed by the SSFTD, cause the processor to:
  automatically de-install from the software stack the one of the software components with a lower version number identified as residing on the first manifest; and
  automatically install to the software stack the software component with a higher version number residing on a second manifest; and
receive, by the SSFTD, the updated task sequence from the installation server, wherein a configuration setting received as an input to the scripting template is a geographic location variable.

2. The computer-readable medium of claim 1, wherein the set of instructions corresponding to the updated task sequence comprise causing the processor to record to a service transaction log when the SSFTD is rebooted.

3. The computer-readable medium of claim 1, wherein the unoptimized software installation file is one-half a size of the optimized software installation file.

4. The computer-readable medium of claim 3, wherein the optimized software installation file is generated using a scripting template comprising if-then commands that accept configuration settings as inputs and output at least a portion of an answer file.

5. The computer-readable medium of claim 3, wherein the scripting template comprises a wisescript file.

6. The computer-readable medium of claim 4, wherein the configuration settings received as an input to the scripting template are a geographic location variable.

7. The computer-readable medium of claim 4, wherein the configuration settings received as an input to the scripting template are a currency type variable.

8. The computer-readable medium of claim 4, wherein the configuration settings received as an input to the scripting template are a user security level variable.

9. The computer-readable medium of claim 1, wherein the SSFTD is an automated teller machine located remote from the installation server.

10. The computer-readable medium of claim 1, wherein the SSFTD is a kiosk located at a bank branch location remote from the installation server.

11. The computer-readable medium of claim 1, wherein the SSFTD is a bank teller kiosk located remote from the installation server.

12. The computer-readable medium of claim 1, wherein the optimized software installation file permits multiple configurations to be created by using one or more configuration settings.

13. A method comprising:
automatically downloading, to a self-service monetary device (SSFTD) over a network from an installation server, a software installation file, wherein a size of the software installation file is optimized by the installation server to be a smaller size than an unoptimized software installation file;
receiving, by a processor in the SSFTD, data representing a first manifest, wherein the first manifest identifies at least some of a plurality of software components;
determining a first one of the software components that is identified by, but not part of, the first manifest;
requesting transfer, by the SSFTD, of the first one of the software components to the SSFTD;
generating, by the SSFTD, an updated task sequence comprising a set of instructions for installing the first one of the software components to a software stack residing on the SSFTD, wherein the set of instructions are generated by the installation server using a scripting template, wherein the set of instructions corresponding to the updated task sequence, when executed, cause the processor to:
  automatically de-install from the software stack the one of the software components with a lower version number identified as residing on the first manifest; and
  automatically install to the software stack the software component with a higher version number residing on a second manifest; and
receiving, by the SSFTD, the updated task sequence from the installation server, wherein a configuration setting received as an input to the scripting template is a geographic location variable.

14. The method of claim 13, wherein the set of instructions corresponding to the updated task sequence comprise causing the processor to record to a service transaction log when the SSFTD is rebooted.

15. The method of claim 13, wherein the optimized software installation file is generated using a scripting template comprising if-then commands that accept configuration settings as inputs and output at least a portion of an answer file.

16. The method of claim 13, wherein the configuration settings received as an input to the scripting template are a geographic location variable.

17. The method of claim 13, wherein the SSFTD is an automated teller machine located remote from the installation server, and wherein the optimized software installation file permits multiple configurations to be created by using one or more configuration settings.

\* \* \* \* \*